(12) United States Patent
Crego et al.

(10) Patent No.: US 11,590,969 B1
(45) Date of Patent: Feb. 28, 2023

(54) EVENT DETECTION BASED ON VEHICLE DATA

(71) Applicant: Zoox, Inc., Foster City, CA (US)

(72) Inventors: Andrew Scott Crego, Foster City, CA (US); Ali Ghasemzadehkhoshgroudi, Foster City, CA (US); Sai Anurag Modalavalasa, Foster City, CA (US); Andreas Christian Reschka, Foster City, CA (US); Siavosh Rezvan Behbahani, Redwood City, CA (US); Lingqiao Qin, Foster City, CA (US)

(73) Assignee: Zoox, Inc., Foster City, CA (US)

(*) Notice: Subject to any disclaimer, the term of this patent is extended or adjusted under 35 U.S.C. 154(b) by 587 days.

(21) Appl. No.: 16/703,625

(22) Filed: Dec. 4, 2019

(51) Int. Cl.
*B60W 30/095* (2012.01)
*G06N 3/08* (2006.01)
*G06K 9/62* (2022.01)

(52) U.S. Cl.
CPC ....... *B60W 30/0953* (2013.01); *G06K 9/6256* (2013.01); *G06K 9/6292* (2013.01); *G06N 3/08* (2013.01); *B60W 2520/105* (2013.01); *B60W 2554/80* (2020.02)

(58) Field of Classification Search
CPC ....... B60W 30/0953; B60W 2520/105; B60W 2554/80; B60W 30/0956; B60W 2554/00; G06K 9/6256; G06K 9/6292; G06N 3/08; G06N 20/00; G06N 20/20; G06N 5/003; G01S 13/00; G01S 13/86; G01S 13/862; G01S 13/865; G01S 13/931; G01S 15/931; G01S 17/931; G01S 2013/9318; G01S 2013/93185; G01S 2013/9319; G01S 7/412; G01S 7/417; G01S 7/539; G05D 1/0221; G05D 2201/0213; G08G 1/00; G08G 1/0112; G08G 1/0129; G08G 1/167;

(Continued)

(56) References Cited

U.S. PATENT DOCUMENTS

| 10,373,259 | B1* | 8/2019 | Konrardy | G06Q 40/08 |
| 11,120,353 | B2* | 9/2021 | Olabiyi | B60W 50/0097 |
| 2018/0275667 | A1* | 9/2018 | Liu | B60W 50/029 |

(Continued)

FOREIGN PATENT DOCUMENTS

CN 109278757 B * 10/2020 ........... B60R 21/015

*Primary Examiner* — Babar Sarwar
(74) *Attorney, Agent, or Firm* — Lee & Hayes, P.C.

(57) ABSTRACT

Techniques and methods for training and/or using a machine learned model that identifies unsafe events. For instance, computing device(s) may receive input data, such as vehicle data generated by one or more vehicles and/or simulation data representing a simulated environment. The computing device(s) may then analyze features represented by the input data using one or more criteria in order to identify potential unsafe events represented by the input data. Additionally, the computing device(s) may receive ground truth data classifying the identified events as unsafe events or safe events. The computing device(s) may then train the machine learned model using at least the input data representing the unsafe events and the classifications. Next, when the computing device(s) and/or vehicles receive input data, the computing device(s) and/or vehicles may use the machine learned model to determine if the input data represents unsafe events.

20 Claims, 9 Drawing Sheets

(58) Field of Classification Search
CPC ...... G06V 20/44; G06V 20/56; G06V 20/584; G06V 20/588
See application file for complete search history.

(56) References Cited

U.S. PATENT DOCUMENTS

| | | | |
|---|---|---|---|
| 2019/0204842 A1* | 7/2019 | Jafari Tafti | B60W 60/0011 |
| 2019/0308620 A1* | 10/2019 | Sapp | B60W 30/0956 |
| 2020/0065711 A1* | 2/2020 | Clément | B60W 40/02 |
| 2020/0079308 A1* | 3/2020 | Vanterpool | B60R 19/483 |
| 2020/0086864 A1* | 3/2020 | Rajendra Zanpure | G06V 20/56 |
| 2020/0090426 A1* | 3/2020 | Barnes | G06N 5/003 |
| 2020/0114924 A1* | 4/2020 | Chen | G06V 40/20 |
| 2020/0151611 A1* | 5/2020 | McGavran | H04W 4/48 |
| 2020/0383622 A1* | 12/2020 | Ali | A61B 5/1101 |
| 2021/0163038 A1* | 6/2021 | Huang | G06V 20/52 |

\* cited by examiner

EVENT DETECTION BASED ON VEHICLE DATA

BACKGROUND

Autonomous vehicles may navigate along routes. For example, when the autonomous vehicles receive requests to travel to destination locations, the autonomous vehicles may navigate along routes from the current locations of the autonomous vehicles to a pickup location to pick up a passenger and/or from the pickup location to the destination locations. While navigating, the autonomous vehicles may encounter other objects in the environment which could cause unsafe events, such as near collisions with the autonomous vehicle. Such unsafe events may cause the autonomous vehicles to take one or more actions in order to avoid the collisions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
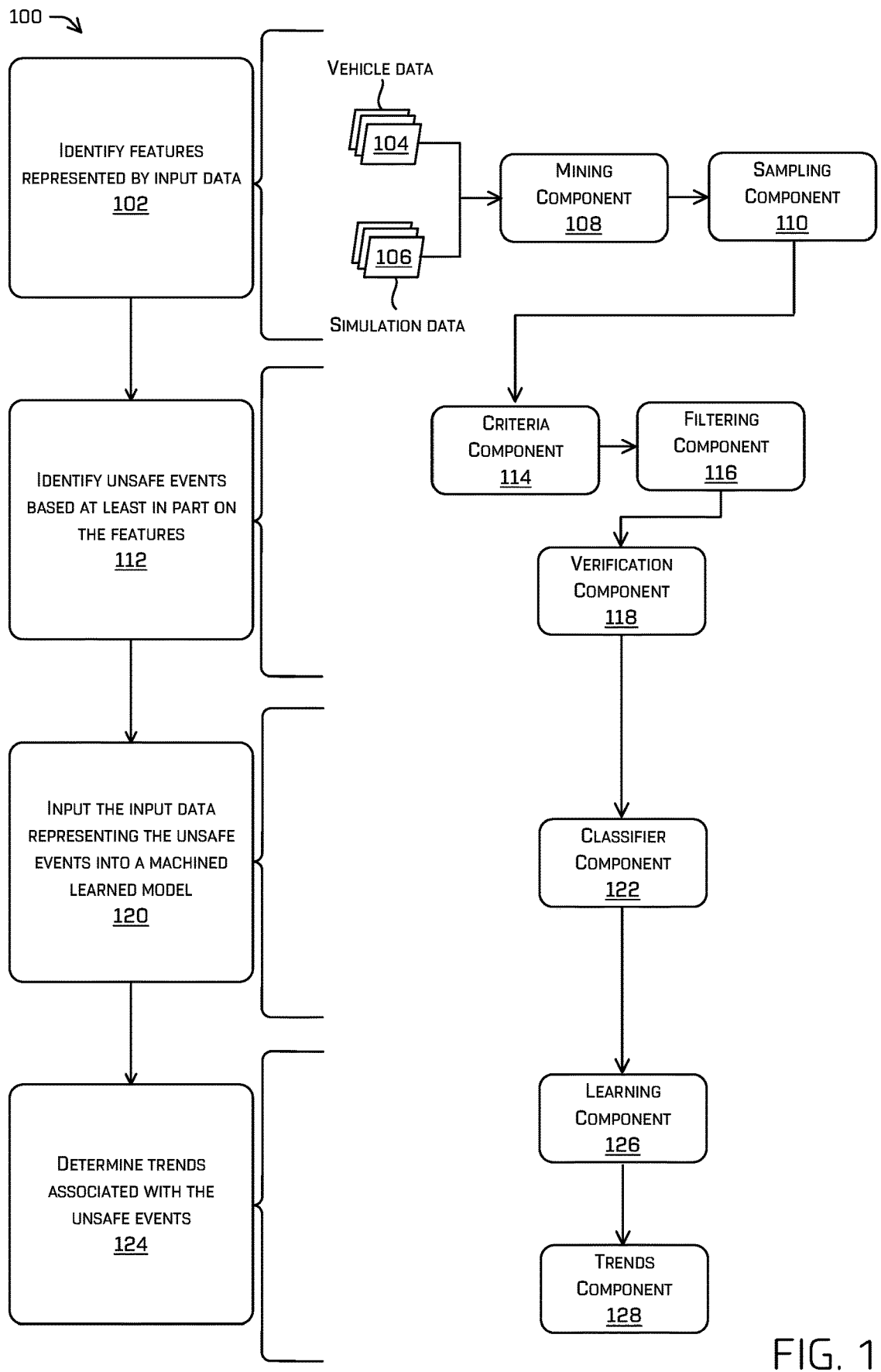
FIG. 1 is an example process for training a machined learned component to identity unsafe events, in accordance with embodiments of the disclosure.

As discussed above, autonomous vehicles may navigate along routes, which, in some examples, may be defined by waypoints. For example, when an autonomous vehicle receives a request to travel to a destination location, the autonomous vehicle may navigate along a route from the current location of the autonomous vehicle to a pickup location to pick up a passenger and then from the pickup location to the destination location. While navigating, the autonomous vehicle may encounter other objects in the environment which may cause unsafe events, such as a potentially unsafe operation of the autonomous vehicle (e.g., a near collisions with the autonomous vehicle). Sensor data generated by the sensors of the autonomous vehicles may represent these objects and/or events. This sensor data may be valuable for training systems of the autonomous vehicles, such that the autonomous vehicles take safety precautions when later encountering similar events.

As such, this disclosure is directed to systems, methods, and apparatuses for training one or more machine learned models to identity unsafe events. For instance, computing device(s) may use one or more criteria to identify potentially unsafe events represented by input data. The computing device(s) may then receive ground truth data classifying the potentially unsafe events as either actual unsafe events or safe events. In some examples, the ground truth data may be obtained from log data captured during previous operation of one or more autonomous vehicles. Using the input data representing the unsafe events and the classifications, the computing device(s) may train a machine learned model. After training, the computing device(s) can use the machine learned model to identify unsafe events in additional input data and/or the autonomous vehicles can use the machine learned model to identity unsafe events while navigating along trajectories.

For more information, the computing device(s) may analyze input data using one or more machine learned models in order to detect events. The input data can include vehicle data and/or simulation data. The vehicle data can include sensor data captured by sensor(s) of autonomous vehicles, perception data indicating object(s) identified by the system(s) onboard the autonomous vehicles (or produced during a post-processing phase), prediction data indicating intent(s) of the object(s) (whether produced during the recording or subsequent thereto), status data indicating diagnostic information, trajectory information, internal sensors (e.g., wheel encoders, temperature sensors, voltage sensors, etc.) and other information generated by the autonomous vehicles, and/or the like. The computing device(s) may receive the vehicle data, via a network, from the autonomous vehicles.

The simulation data can be generated during simulations, where the simulations are used to validate software executed on the autonomous vehicles and gather data indicating how the autonomous vehicles respond to various scenarios. Simulations can also be useful for generating feedback for improving operations and designs of autonomous vehicles.

Initially, the input data may be used to train a machine learned model in order to detect events, such as unsafe events, that occur with the autonomous vehicles. In some examples, an unsafe event may include an event where an autonomous vehicle had to take one or more actions in order to avoid a collision with another object (e.g., an unsafe driving operation associated with the autonomous vehicle). The one or more actions may include, but are not limited to, changing a velocity of the autonomous vehicle (e.g., slowing down), changing a trajectory of the autonomous vehicle (e.g., turning), causing the autonomous vehicle to safely park, and/or the like. Additionally, or alternatively, in some examples, an unsafe event may include an event where there is an increased risk of collision between an autonomous vehicle and another object. For instance, an unsafe event may include an autonomous vehicle passing a pedestrian, which is jaywalking in a roadway, at a high velocity.

In order to train the machine learned model, the computing device(s) analyze the input data in order to extract features represented by the input data. The features may include, but are not limited to, a speed associated with an autonomous vehicle, an acceleration associated with an autonomous vehicle, a deceleration associated with an autonomous vehicle, a pose of an autonomous vehicle, a direction of travel of an autonomous vehicle, a distance between an autonomous vehicle and an object (e.g., a closeness in space between two vehicles), a time difference between when an autonomous vehicle navigates to a location and another vehicle navigates to the location (e.g., a closeness in time between two vehicles), and/or the like. In some instances, the computing device(s) determine the features at various time interval(s) within the input data. The time interval(s) may include, but are not limited to, 0.1 seconds, 0.2 seconds, 0.5 seconds, 1 second, 5 seconds, and/or the like.

The computing device(s) may then analyze the features using one or more criteria that identify events represents by the input data. For instance, the one or more criteria may identify events that include, but are not limited to, a time to collision between an autonomous vehicle and an object is less than a time threshold, a deceleration of an autonomous vehicle is equal to or greater than a deceleration threshold, a distance between an autonomous vehicle and another object is less than a distance threshold when a velocity of the autonomous vehicle is equal to or greater than a velocity threshold, a minimum stopping distance associated with an autonomous vehicle is less than a distance to a potential point of collision, an acceleration time of an autonomous vehicle is equal to or greater than a time threshold, a deceleration time of an autonomous vehicle is equal to or greater than a time threshold, and/or the like. In some instances, the events identified using the one or more criteria include potentially unsafe events.

As described herein, a time threshold may include, but is not limited to, 0.5 seconds, 1 second, 1.5 seconds, 5 seconds, and/or the like. Additionally, a distance threshold may include, but is not limited to, 1 meter, 3 meters, 5 meters, 10 meters, and/or the like. Furthermore, a deceleration/acceleration threshold may include, but is not limited to, 3 meters per second squared, 3.4 meters per second squared, 5 meters per second squared, and/or the like. Moreover, a velocity threshold may include, but is not limited to, 5 meters per second, 10 meters per second, 15 meters per second, and/or the like.

For an example of identifying an event, the computing device(s) may analyze the features and, based at least in part on the analysis, determine that the features indicate that an autonomous vehicle was traveling at a velocity (e.g., 4 meters per second) when there was another vehicle located a distance in front of the autonomous vehicle (e.g., 5 meters in front of the autonomous vehicle). The computing device(s) may then use those features to determine a time to collision between the autonomous vehicle and the other vehicle (e.g., the time to collision is 1.25 seconds). Using the one or more criteria, the computing device(s) may identify an event by determining that the time to collision is less than a time threshold (e.g., 1.5 seconds).

The computing device(s) may then receive ground truth data associated with the identified events, where the ground truth data can be manually labeled and/or determined from other, validated, machine learned components. For instance, the ground truth data may classify whether the identified events, which may include potentially unsafe events, include actual unsafe events or do not include unsafe events (e.g., include safe events). In some instances, the computing device(s) send the input data representing the identified events to one or more other devices for analysis, such as human analysis. The computing device(s) then receive the ground truth data from the one or more other devices. In other words, after the computing device(s) identify the potentially unsafe events, the identified events may be further analyzed, such as by human viewing the input data representing the events, to determine whether the potentially unsafe events include safe events or unsafe events.

This ground truth data, which may correspond to log data, may then be used to train a machine learning component in order to generate a machine learned component (e.g., a machine learned model). For instance, the log data is labeled as including both safe events and unsafe events. In some instances, the log data is further labeled to indicate which features caused the events to include the safe events or the unsafe event. For example, the log data may be labeled as including an unsafe event based at least in part on the log data including features representing one or more of the criteria (e.g., a deceleration of an autonomous vehicle is equal to or greater than a deceleration threshold). As such, using this log data, the machine learned component can be trained such that the machine learned component can later be used to analyze additional input data (which may not already be classified) in order to identify unsafe events. In some instances, the machine learned component identifies the unsafe events by determining that the additional input data represents similar features as the input data that was used to train the machine learned component.

For an example of training a machine learned component, the input data representing the unsafe events and/or the classifications (e.g., the log data) may be input into a machine learned component in order to train the machine learned component. For instance, one or more parameters of the machine learned component may be altered using the input data representing the events and/or the classifications. By altering the one or more parameters, the machine learned component may "learn" over time to accurately identify an unsafe event represented by additional input data that is later input into the machine learned component. For instance, the machine learned component may analyze the additional input data and, based at least in part on the analysis, output data classifying whether the additional input data represents a safe event or an unsafe event.

In some instances, even when later using the machine learned model to identify unsafe events, the computing device(s) may continue to "train" the machine learned component, which may be referred to as "on-line training". For example, the computing device(s) may again receive ground truth data classifying whether the additional input data represents an unsafe event. The computing device(s) may then compare the output from the machine learned component to the ground truth data to determine whether there is a difference between the ground truth data and the output data. For example, the computing device(s) may identity a difference when the ground truth data classifies an event as a safe event and the output data classifies the event as an unsafe event and/or the ground truth data classifies an event as an unsafe event and the output data classifies the event as a safe event. If the computing device(s) identify a difference, the computing device(s) may input the input data representing the event, as well as the classification from the ground truth data (e.g., the difference), into the machine learned model in order to further alter the one or more parameters. This way, the machine learning model may continue to "learn" over time.

In some instances, the computing device(s) may further analyze the input data representing the unsafe events in order to identify trends within the input data. For example, the computing device(s) may identify multiple unsafe events that include similar features and group the unsafe events as relating to a trend. In some instances, the computing device(s) may then use the input data representing the group of unsafe events to train one or more additional machine learned models. This way, the other machine learned model(s) may learn how to identity specific unsafe events by analyzing additional input data received by the computing device(s) and/or the autonomous vehicles.

In some instances, the computing device(s) may send the machine learned model to the autonomous vehicles. The autonomous vehicles may then use the machined learned model to analyze vehicle data as the autonomous vehicles are navigating along trajectories. By analyzing the vehicle data, the autonomous vehicles may be able to detect unsafe events in "real-time" as the autonomous vehicles are navigating around various environments. Additionally, the autonomous vehicles are able to perform one or more actions when detecting unsafe events. For example, if an autonomous vehicle detects an unsafe event, the autonomous vehicle may perform one or more actions, such as changing a speed of the autonomous vehicle, in order to avoid a potential collision with another object.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data). Additionally, the techniques described herein may be used with real data (e.g., captured using sensor(s)), simulated data (e.g., generated by a simulator), or any combination of the two.

FIG. 1 is an example process 100 for training a machined learned component to identity unsafe events, in accordance with embodiments of the disclosure. At operation 102, the process 100 may include identifying features represented by input data. For instance, computing device(s) may process the input data, such as vehicle data 104 generated by one or more vehicles and/or simulation data 106. In some instances, the computing device(s) process the input data using a mining component 108. The mining component 108 may be configured to analyze the input data in order to identity the features represented by the input data. The computing device(s) may further process the input data using a sampling component 110. The sampling component 110 may be configured to sample the input data various time intervals.

For instance, the output of operation 102 may indicate features represented by the input data at various timestamps within the input data. For example, the output may indicate that, at a given time (e.g., 1 second), a vehicle has a given acceleration (e.g., 2 meters per second squared), the vehicle has a given velocity (e.g., 4 meter per second), the vehicle has a given a position and/or orientation (e.g., one or more of an x-, y-, z-position, roll, pitch, or yaw), the vehicle is a given distance from another object (e.g., 8 meters), and/or the like.

At operation 112, the process 100 may include identifying unsafe events based at least in part on the features. For instance, a criteria component 114 of the computing device(s) may be configured to analyze the features in order to identity potentially unsafe events represented by the input data. In some instances, the criteria component 114 analyzes the features using the one or more criteria described herein. For example, the criteria component 114 may identity an event, such as a time to collision is less than a threshold time (e.g., a criteria), based at least in part on a first feature indicating that a vehicle is traveling at a velocity (e.g., 4 meters per second) and a second feature indicating that the vehicle is a given distance from another object (e.g., 8 meters). For another example, the criteria component 108 may identity an event, such as an acceleration time of the vehicle is equal to or greater than a time threshold (e.g., a criteria), when the features represented by the input data indicate that the vehicle accelerated for longer than the time threshold (e.g., 3 seconds).

A filtering component 116 of the computing device(s) may then be configured to analyze the identified events in order to filter out the input data that represents the identified event. For example, the filtering component 116 may extract the portions of the input data that represent the identified events. This way, the filtering component 116 is able to reduce the amount of input data that is later analyzed by one or more additional components.

Next, a verification component 118 of the computing device(s) may be configured to classify the potentially unsafe events as unsafe events or safe events. In some instances, the verification component 118 classifies the events using ground truth data received from one or more other devices, where the ground truth data classifies an event as an unsafe event or a safe event. For instance, the input data representing the identified events may be used to display the events to one or more humans on one or more computing devices. While viewing the events, the one or more computing devices may receive inputs indicating whether the events are unsafe events or safe events. The ground truth data may represent the inputs received by the one or more computing devices. The verification component 118 may further be configured to generate a training database using the unsafe events. For instance, the verification component 118 may cause the input data representing the unsafe events to be stored in one or more databases.

Figure 2:
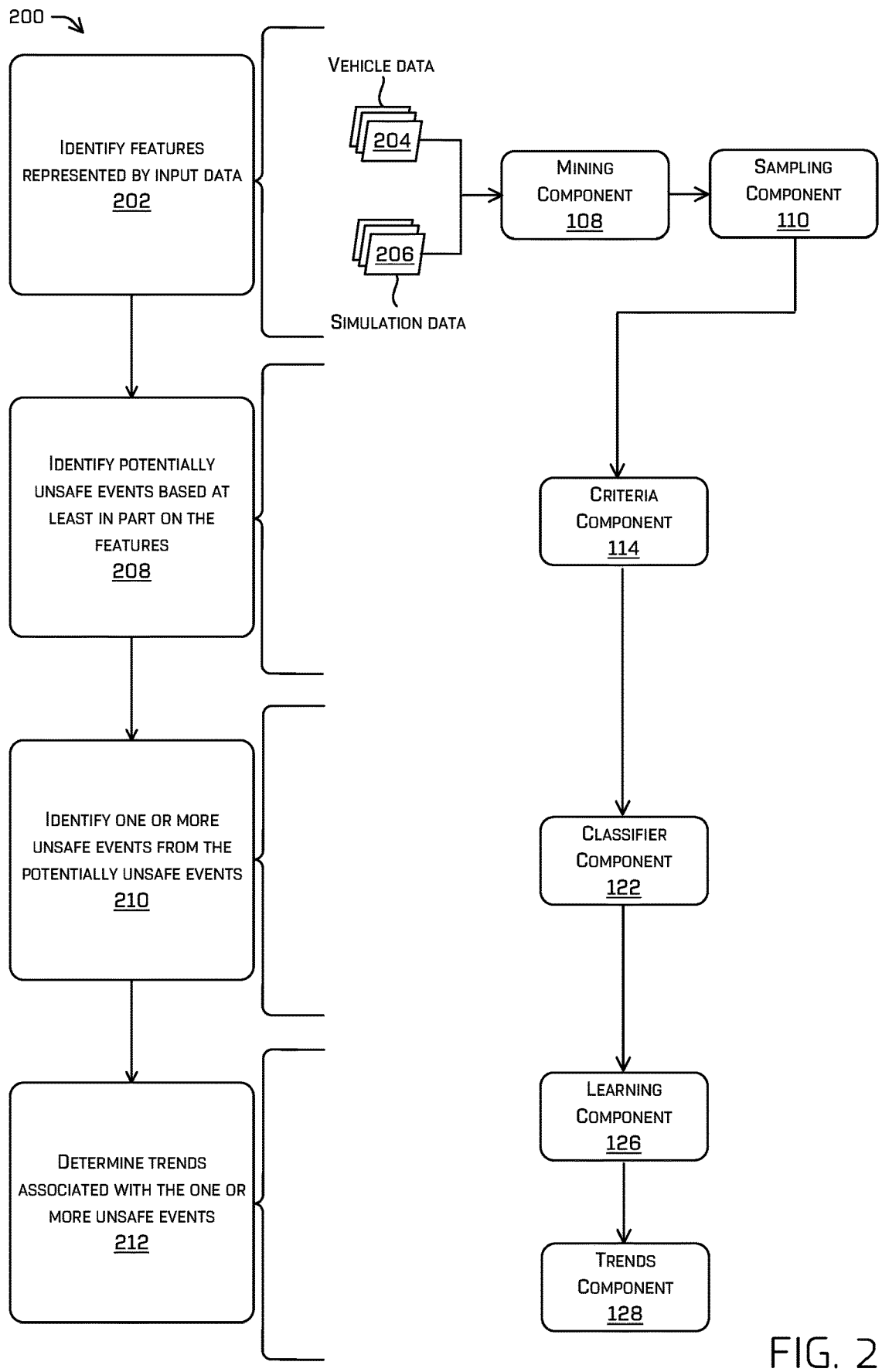
FIG. 2 is an example process for using a machined learned component to identity unsafe events, in accordance with embodiments of the disclosure.

At operation 120, the process 100 may include inputting the input data representing the unsafe events into a machined learned model. For instance, the computing device(s) may input the input data representing the unsafe events into a classifier component 122, where the classifier component 122 may include a machined learned model that is used to detect unsafe events. One or more parameters of the classifier component 122 may be altered using the input data representing the unsafe events and/or the classifications. By altering the one or more parameters, the classifier component 122 may "learn" over time to accurately identify an unsafe event represented by additional input data that is later input into the classifier component (which is represented in FIG. 2).

Figure 5:
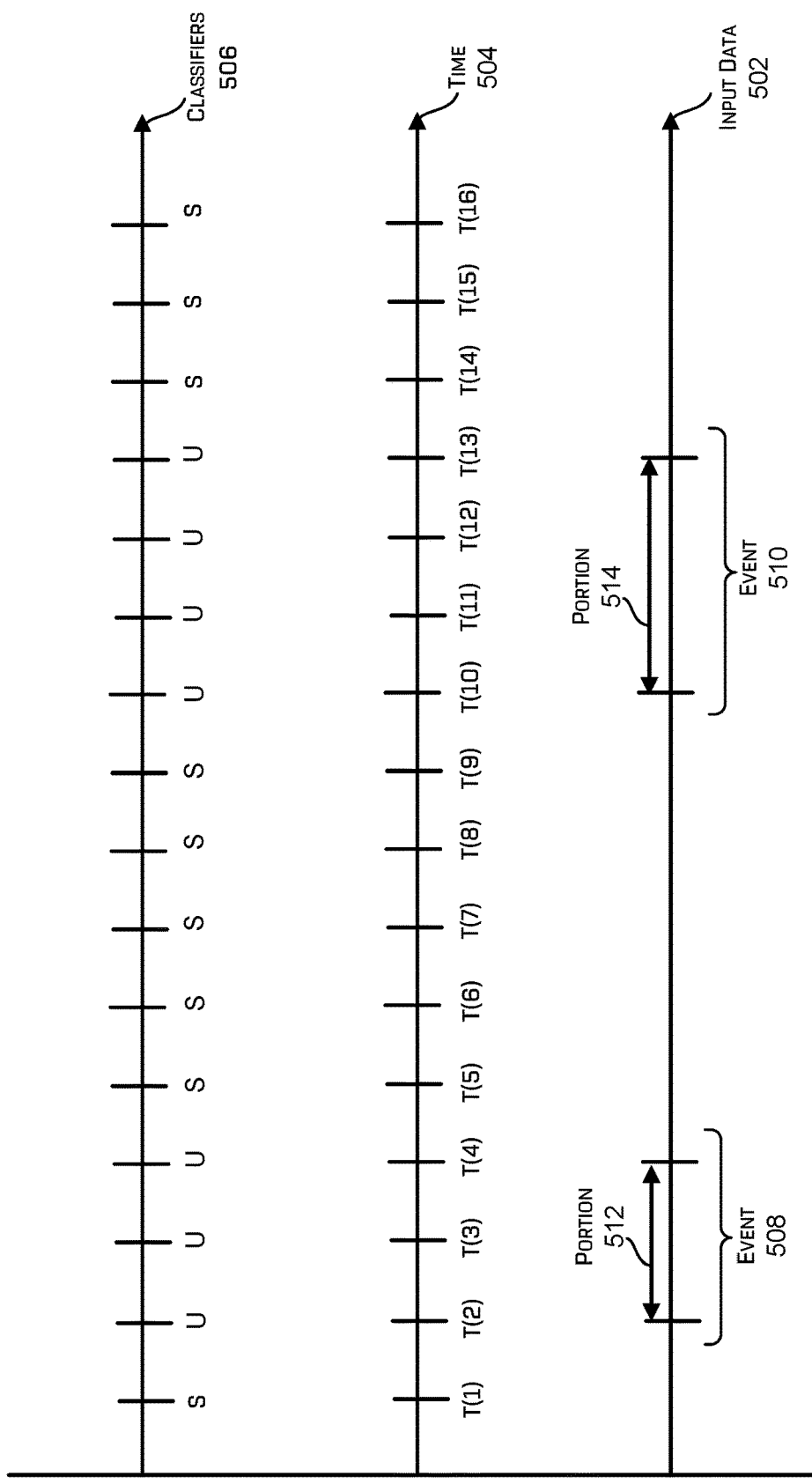
FIG. 5 is an example of classifying input data as including a safe event or an unsafe event, in accordance with embodiments of the disclosure.

In some instances, the output from the classifier component 122 may indicate portions of the input data that represent the unsafe events. These portions of the input data may correspond to frames. Additionally, or alternately, in some instances, the output from the classifier component 122 may indicate portions of the input data that represent safe events. Again, these portions of the input data may correspond to frames. In other words, after the analysis by the classifier component 122, the input data may be partitioned into portions of the input data that represent unsafe events and portions of the input data that represent safe events, which is illustrated in the example of FIG. 5.

At operation 124, the process 100 may include determining trends associated with the unsafe events. For instance, a learning component 126 of the computing device(s) may be configured to analyze the input data representing the unsafe events in order to identify trends associated with the unsafe events. In some instances, the learning component 126 may identify a trend associated with unsafe events when the unsafe events include similar features as one another. For example, the learning component 126 may identify a trend associated with unsafe events when the unsafe events are associated with autonomous vehicles passing within a threshold distance to pedestrians at velocities that are equal to greater than a threshold velocity. In other words, each of the unsafe events includes similar features and as such, there is a trend associated with the unsafe events.

In some instances, a trends component 128 of the computing device(s) may be configured to store the input data representing the trends of unsafe events in one or more databases. The computing device(s) may then use the stored input data to train one or more other machined learned components.

FIG. 2 is an example process 200 for using a machined learned component to identity unsafe events, in accordance with embodiments of the disclosure. At operation 202, the process 200 may include identifying features represented by input data. For instance, computing device(s) may process the input data, such as vehicle data 204 generated by one or more vehicles and/or simulation data 206. In some instances, the computing device(s) process the input data using the mining component 108. The mining component 108 may be configured to analyze the input data in order to identity the features represented by the input data. The computing device(s) may further process the input data using the sampling component 110. The sampling component 110 may be configured to sample the input data various time intervals. For example, the output of operation 102 may indicate features represented by the input data at the given time intervals.

At operation 208, the process 200 may include identifying potentially unsafe events based at least in part on the features. For instance, the criteria component 114 of the computing device(s) may be configured to analyze the features in order to identity potentially unsafe events represented by the input data. In some instances, the criteria component 114 analyzes the features using the one or more criteria described herein. In some instances, the one or more criteria may be used by the criteria component 114 to detect "potentially" unsafe events. In other words, the one more criteria identify events that should be further analyzed, such as by the classifier component 122, to verify whether the events include actual unsafe events.

For example, and at operation 210, the process 200 may include identifying one or more unsafe events from the potentially unsafe events. For instance, the computing device(s) may input the input data representing the potentially unsafe events into the classifier component 122, where the classifier component 122 may include a machined learned model that is used to detect unsafe events. The classifier component 122 may then output data that classifies whether a potentially unsafe events includes an unsafe event or a safe event.

At operation 212, the process 200 may include determining trends associated with the one or more unsafe events. For instance, the learning component 126 of the computing device(s) may analyze the input data representing the unsafe events in order to identify trends associated with the unsafe events. In some instances, the learning component 126 may identity a trend associated with unsafe events when the unsafe events include similar features as one another. For example, the learning component 126 may identify a trend associated with unsafe events when the unsafe events are associated with autonomous vehicles passing within a threshold distance to pedestrians at velocities that are equal to greater than a threshold velocity. In other words, each of the unsafe events includes similar features and as such, there is a trend associated with the unsafe events.

In some instances, the trends component 128 of the computing device(s) may then store the input data representing the trend of unsafe events in one or more databases. The computing device(s) may then use the stored input data to train one or more other machined learned components.

Figure 3:
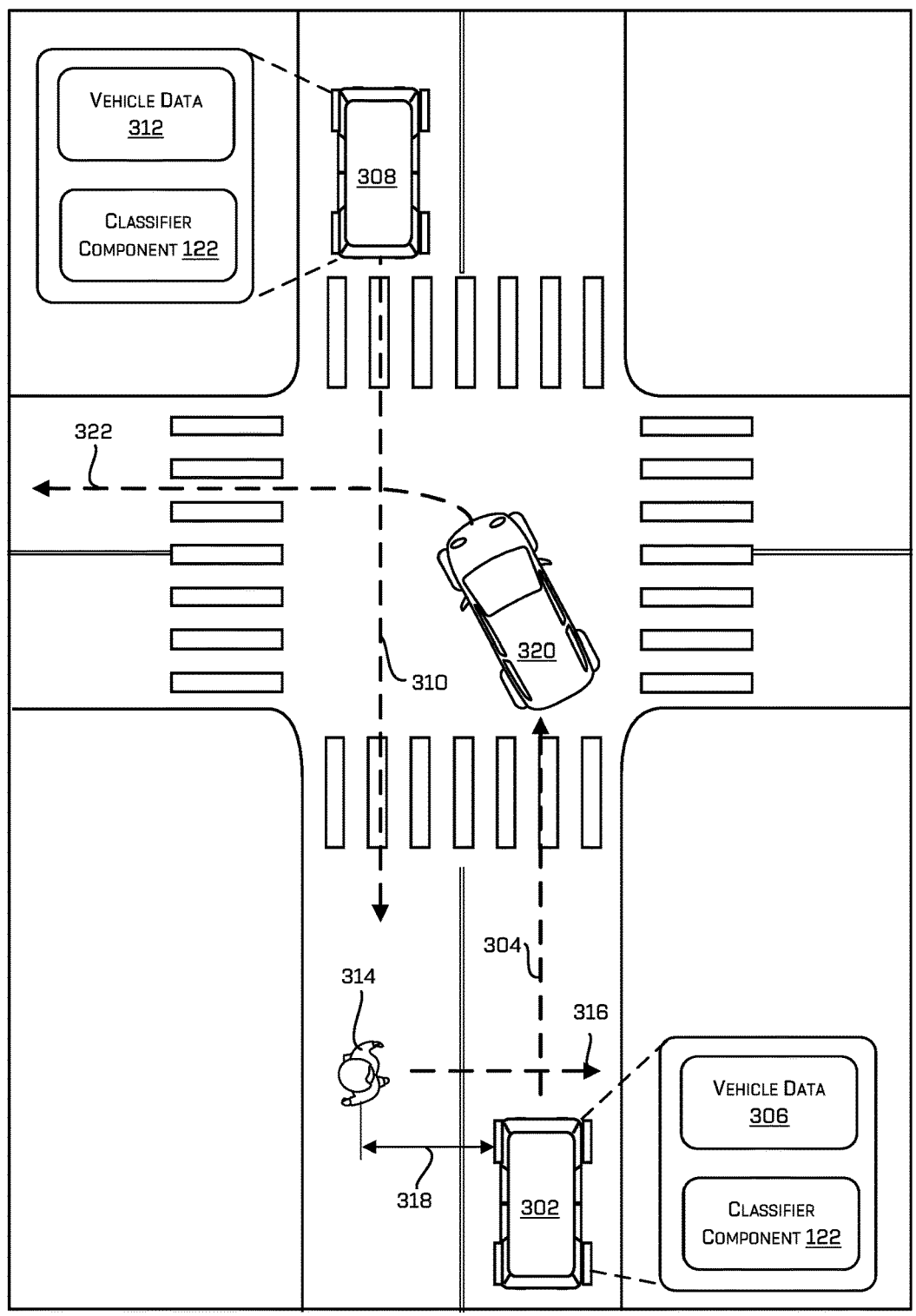
FIG. 3 is an example environment that includes autonomous vehicles encountering unsafe events while navigating along trajectories, in accordance with embodiments of the disclosure.

FIG. 3 is an example environment 300 that includes autonomous vehicles encountering unsafe events while navigating along trajectories, in accordance with embodiments of the disclosure. As shown, a vehicle 302 may be navigating along a trajectory 304 within the environment 300. While navigating, the vehicle 302 may be generating vehicle data 306, such as sensor data, representing the environment 300. Additionally, a vehicle 308 may be navigating along a trajectory 310 within the environment 300. While navigating, the vehicle 308 may be generating vehicle data 312, such as sensor data, representing the environment 300.

The vehicle 302 may encounter an unsafe event while navigating along the trajectory 304. For instance, and as illustrated in the example of FIG. 3, a pedestrian 314 may be traveling along a trajectory 316 within the environment 300. While navigating along the trajectory 304, the vehicle 302 may pass by the pedestrian 314, where the vehicle 302 is a distance 318 from the pedestrian 314 when passing by the pedestrian 314. Additionally, the vehicle 302 may be traveling at a velocity that exceeds a velocity threshold. As such, the vehicle 302 may encounter the unsafe event since the distance 318 between the vehicle 302 and the pedestrian 314 is less than a distance threshold and the velocity of the vehicle 302 is equal to or greater than a velocity threshold. The vehicle 302 may send the vehicle data 306 representing this unsafe event to computing device(s).

Additionally, the vehicle 308 may encounter an unsafe event while navigating along the trajectory 310. For instance, and as illustrated in the example of FIG. 3, another vehicle 320 may be traveling along a trajectory 322 within the environment 300, where the trajectory 310 of the vehicle 308 intersects with the trajectory 322 of the vehicle 320. As such, and while navigating along the trajectory 304, a time to collision between the vehicle 308 and the vehicle 320 may be less than a time threshold. This may create the unsafe event for the vehicle 308. The vehicle 308 may send the vehicle data 312 representing this unsafe event to computing device(s).

Figure 4:
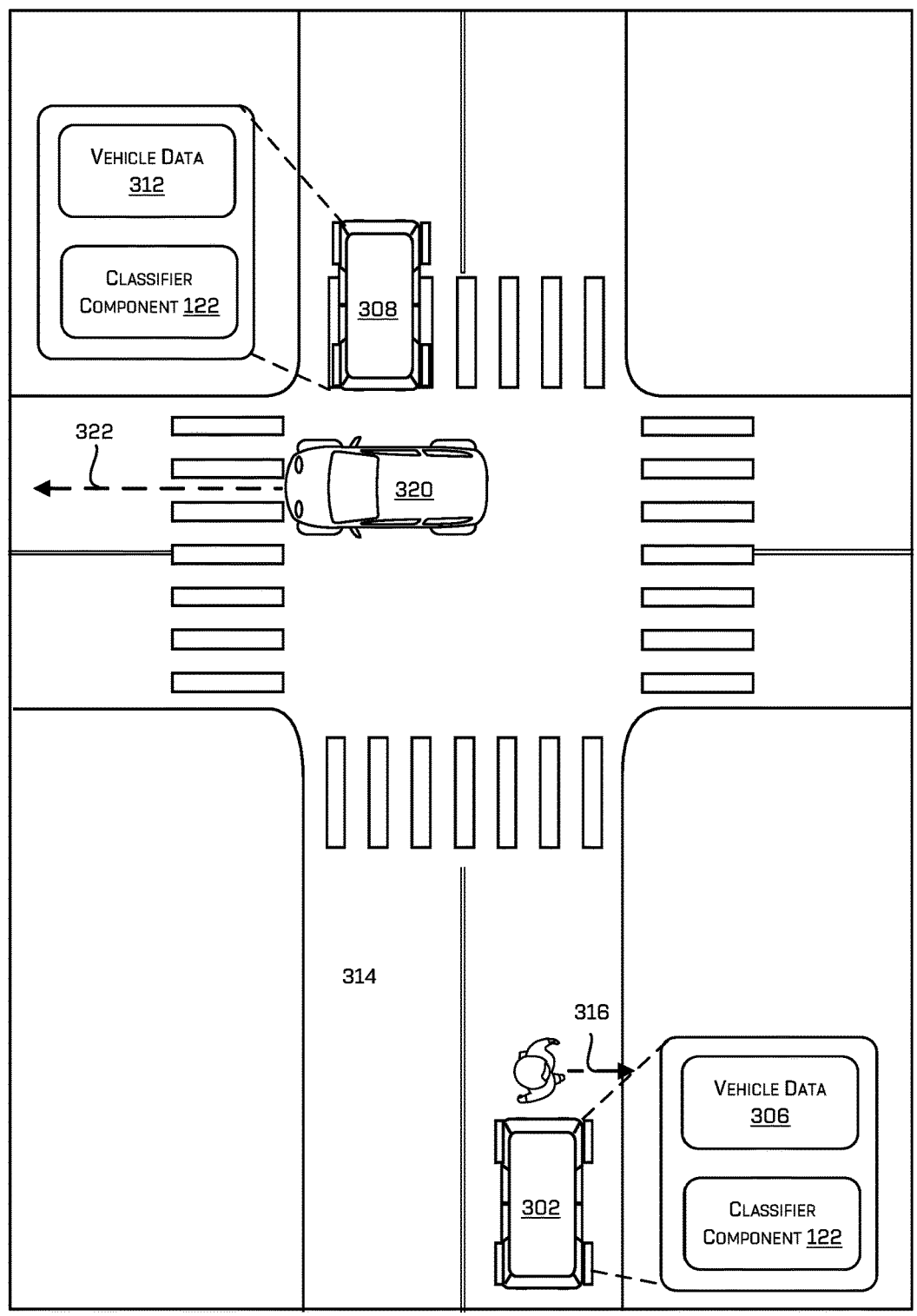
FIG. 4 illustrates an example environment that includes autonomous vehicles performing actions after identifying unsafe events, in accordance with embodiments of the disclosure.

FIG. 4 illustrates the example of the environment 300 that now includes the autonomous vehicles performing actions after identifying unsafe events, in accordance with embodiments of the disclosure. For instance, and as illustrated in the example of FIG. 4, the vehicle 302 and/or the vehicle 308 may identity the unsafe events using the classifier component 122. For instance, after training the classifier component 122, the computing device(s) may send the classifier component 122 to the vehicle 302 and/or the vehicle 308 to use to identify unsafe events when navigating within the environment 300.

For a first example, the classifier component 122 of the vehicle 302 may analyze the vehicle data 306 representing the unsafe event. Based at least in part on the analysis, the classifier component 122 may determine that the distance 318 from the pedestrian 314 is less than the distance threshold while the velocity of the vehicle 302 is equal to or greater than the velocity threshold. As such, the classifier component 122 may output data indicating that the vehicle 302 is approaching an unsafe event. The vehicle 302 may than take one or more actions to avoid the unsafe event. For instance, the vehicle 302 may change a velocity of the vehicle 302 (e.g., reduce the velocity), change the trajectory of the vehicle 302 (e.g., turn to the right), safely stop at a location, and/or the like. As shown in the example of FIG. 4, the vehicle 302 may stop such that the pedestrian 316 can continue along the trajectory 316.

For another example, the classifier component 122 of the vehicle 308 may analyze the vehicle data 312 representing the unsafe event. Based at least in part on the analysis, the classifier component 122 may determine that the time to collision between the vehicle 308 and the vehicle 320 is less than the time threshold. As such, the classifier component 122 may output data indicating that the vehicle 308 is approaching an unsafe event. In some instances, the vehicle 308 may than take one or more actions to avoid the unsafe event. For instance, and as illustrated in the example of FIG. 4, the vehicle 408 may stop in order to avoid the potential collision with the vehicle 320.

In some instances, the computing device(s) may continue to receive the vehicle data (e.g., the vehicle data 306, the vehicle data 312, etc.) from vehicles (e.g., the vehicle 302, the vehicle 308, etc.) and use the vehicle data to further train the classifier component 122. The computing device(s) may then send the updated classifier component 122 to the vehicles. This way, the vehicles will continue to use the most updated classifier component 122 when navigating in order to identify unsafe events. This will increase the safety for the vehicles, as well as other objects located within the environment 300, as the vehicles will be better equipped to avoid collisions.

FIG. 5 is an example of classifying input data as including a safe event or an unsafe event, in accordance with embodiments of the disclosure. As shown, the classifier component 122 may analyze input data 502 over a period of time 504 and, based at least in part on the analysis, output classifiers 506 indicating whether the input data 502 represents safe events (e.g., "S" in the example of FIG. 5) or unsafe events (e.g., "U" in the example of FIG. 5). In some instances, the classifier component 122 analyzes the input data 502 at different time intervals T(1)-T(16). The time intervals (1)-(16) may include, but are not limited to, 0.1 seconds, 0.2 seconds, 0.5 seconds, 1 second, 5 seconds, and/or the like.

In the example of FIG. 5, the classifier component 122 may identify a first event 508 that occurs between time intervals T(2) and T(5) and a second event that occurs between time intervals T(10) and T(13). As such, the classifier component 122 outputs classifiers 506 indicating that those time intervals represent unsafe events. Additionally, the classifier component 122 may determine that safe events occur at time interval T(1), between time intervals T(5) and T(9), and between time intervals T(14) and T(16). As such, the classifier component 122 outputs classifiers 506 indicating that those time intervals represent safe events.

In some instances, the classifier component 122 may determine that the second event 510 includes a different event than the first event 508 based at least in part on a given time period elapsing between the first event 508 and the second event 510. The given time period may include, but is not limited to, 1 second, 2 seconds, 0.4 seconds, 1 second, 5 seconds, and/or the like. In some instances, the computing device(s) may store a first portion 512 of the input data 502 representing the first event 508 and/or a second portion 514 of the input data 502 representing the second event 510. The first portion 512 of the input data 502 and/or the second portion 514 of the input data 502 may be classified as including unsafe events. In some instances, the first portion 512 of the input data 502 and/or the second portion 514 of the input data 502 may each represent one or more frames of the input data 502.

Figure 6:
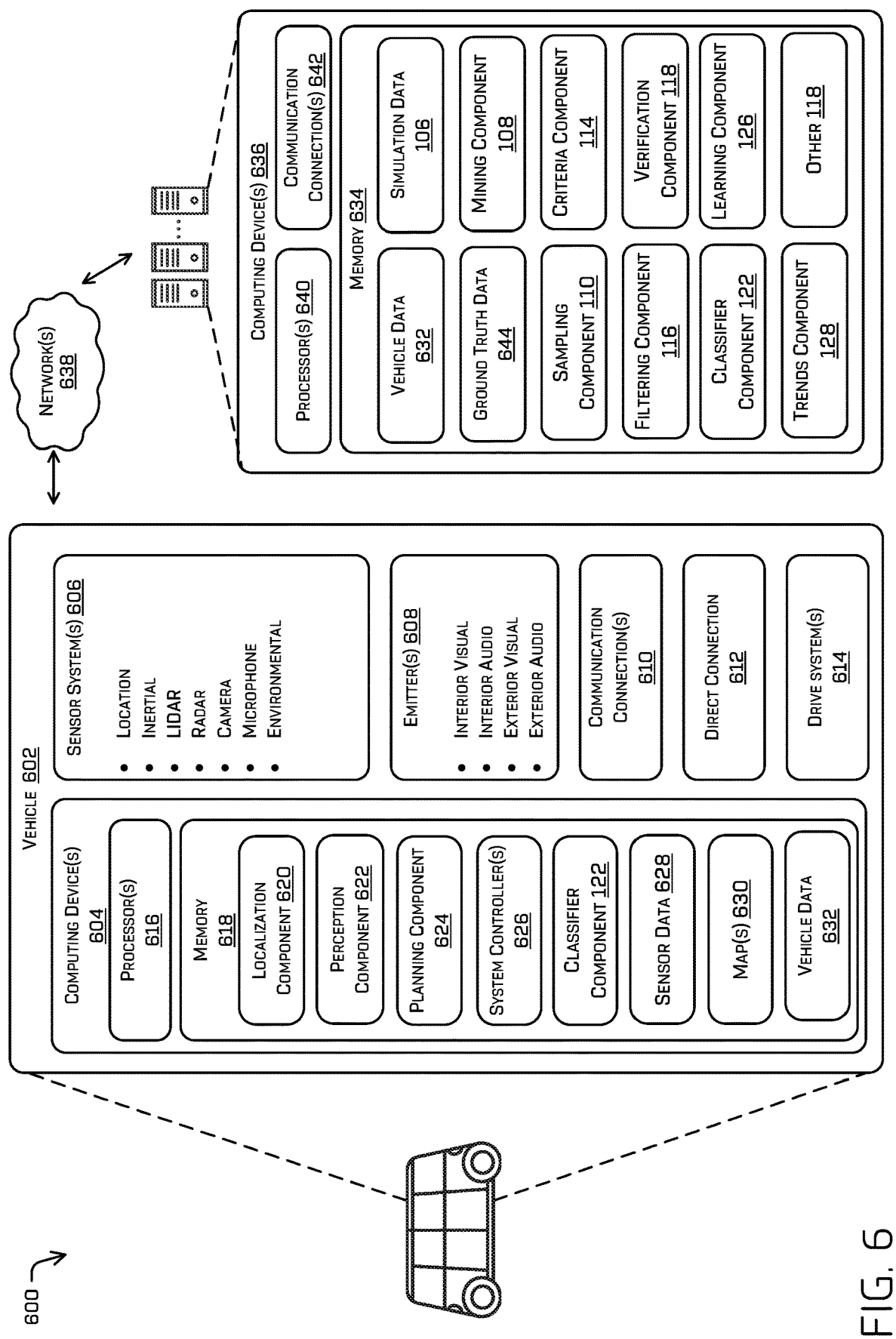
FIG. 6 is a block diagram of an example system for implementing the techniques described herein, in accordance with embodiments of the disclosure.

FIG. 6 is a block diagram of an example system 600 for implementing the techniques described herein. In at least one example, the system 600 may include a vehicle 602, such as the vehicle 302 and/or the vehicle 308.

The vehicle 602 may include vehicle computing device(s) 604, sensor system(s) 606, emitter(s) 608, communication connection(s) 610, at least one direct connection 612, and drive system(s) 614.

The vehicle computing device(s) 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera enabled smartphone). In the illustrated example, the memory 618 of the vehicle computing device(s) 604 stores a localization component 620, a perception component 622, a planning component 624, one or more system controllers 626, a classifier component 122, sensor data 628, map(s) 630, and vehicle data 632 (which may represent the vehicle data 104, the vehicle data 204, the vehicle data 306, and/or the vehicle data 312). Though depicted in FIG. 6 as residing in the memory 618 for illustrative purposes, it is contemplated that the localization component 620, the perception component 622, the planning component 624, the system controller(s) 626, and/or the classifier component 122 may additionally, or alternatively, be accessible to the vehicle 602 (e.g., stored on, or otherwise accessible by, memory remote from the vehicle 602, such as, for example, on memory 634 of computing device(s) 636.

In at least one example, the localization component 620 may include functionality to receive the sensor data 628 from the sensor system(s) 606 to determine a position and/or orientation of the vehicle 602 (e.g., one or more of an x-, y-, z-position, roll, pitch, or yaw). For example, the localization component 620 may include and/or request/receive a map of an environment and may continuously determine a location and/or orientation of the vehicle 602 within the map. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the vehicle 602. In some instances, the localization component 620 may provide data to various components of the vehicle 602 to determine an initial position of the vehicle 602 for generating a path polygon associated with the vehicle path, as discussed herein.

In some instances, the perception component 622 may include functionality to perform object detection, segmentation, and/or classification. In some examples, the perception component 622 may provide processed sensor data 628 that indicates a presence of an agent (e.g., entity) that is proximate to the vehicle 602 and/or a classification of the agent as an agent type (e.g., car, pedestrian, cyclist, animal, building, tree, road surface, curb, sidewalk, unknown, etc.). In some examples, the perception component 622 may provide processed sensor data 628 that indicates a presence of a stationary object that is proximate to the vehicle 602 and/or a classification of the stationary object as a type (e.g., building, tree, road surface, curb, sidewalk, unknown, etc.). In additional or alternative examples, the perception component 622 may provide processed sensor data 628 that indicates one or more characteristics associated with a detected agent (e.g., a tracked object) and/or the environment in which the agent is positioned. In some examples, characteristics associated with an agent may include, but are not limited to, an x-position (global and/or local position), a y-position (global and/or local position), a z-position (global and/or local position), an orientation (e.g., a roll, pitch, yaw), an agent type (e.g., a classification), a velocity of the agent, an acceleration of the agent, an extent of the agent (size), etc. Characteristics associated with the environment may include, but are not limited to, a presence of another agent in the environment, a state of another agent in the environment, a time of day, a day of a week, a season, a weather condition, an indication of darkness/light, etc.

In general, the planning component 624 may determine a path for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 624 may generate an instruction for guiding the vehicle 602 along at least a portion of the route from the first location to the second location. In at least one example, the planning component 624 may determine how to guide the vehicle 602 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

In at least one example, the vehicle computing device(s) 604 may include the system controller(s) 626, which may be configured to control steering, propulsion, braking, safety, emitters, communication, and other systems of the vehicle 602. The system controller(s) 626 may communicate with and/or control corresponding systems of the drive system(s) 614 and/or other components of the vehicle 602.

The memory 618 may further include the map(s) 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, and/or the planning component 624 to determine a location of the vehicle 602, detect objects in an environment, detecting parking zones within an environment, and/or generate routes and/or trajectories to navigate within an environment.

In some examples, the map(s) 630 may be stored on a remote computing device(s) (such as the computing device(s) 636) accessible via network(s) 638. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed.

The classifier component 122 may be configured to analyze the vehicle data 632 and, based at least in part on the analysis, identify unsafe events associated with the vehicle 602. In some instance, the vehicle 602 may further include the mining component 108, the sampling component 110, the criteria component 114, and/or the filtering component 116, which the vehicle 602 may additionally use to identify the unsafe events, similar to the computing device(s) 636 described herein. In some instances, based at least in part on identifying an unsafe event, the vehicle 602 may take one or more actions in order to avoid a potential collision.

As can be understood, the components discussed herein (e.g., the localization component 620, the perception component 622, the planning component 624, the system controller(s) 626, the classifier component 122, the mining component 108, the sampling component 110, the criteria component 114, the filtering component 116, the verification component 118, the learning component 126, and/or the trends component 128) are described as divided for illustrative purposes. However, the operations performed by the various components may be combined or performed in any other component. In some instances, aspects of some or all of the components discussed herein may include any models, techniques, and/or machine learned techniques. For example, in some instances, the components in the memory 618 (and the memory 634, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learned, which may refer to a broad class of such techniques in which an output is generated based on learned parameters.

Although discussed in the context of neural networks, any type of machine learned may be used consistent with this disclosure. For example, machine learned techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 606 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the LIDAR sensors may include individual LIDAR sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device(s) 604. Additionally or alternatively, the sensor system(s) 606 may send sensor data 628, via the one or more networks 648, to the computing device(s) 636 at a particular frequency, after a lapse of a predetermined period of time, in near real-time, etc.

The vehicle 602 may also include emitter(s) 608 for emitting light and/or sound, as described above. The emitter(s) 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include communication connection(s) 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) and/or the computing device(s) 636 for receiving sensor data.

The communications connection(s) 610 may include physical and/or logical interfaces for connecting the vehicle computing device(s) 604 to another computing device or a network, such as network(s) 638. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 6G, etc.) or any suitable wired or wireless communications protocol that enables the respective computing device to interface with the other computing device(s).

In at least one example, the vehicle 602 may include drive system(s) 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) 606 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 614. Furthermore, the drive system(s) 614 may also include communication connection(s) that enable communication by the respective drive system with one or more other local or remote computing device(s).

In at least one example, the direct connection 612 may provide a physical interface to couple the drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the planning component 624, the system controller(s) 626, the classifier component 122, and various components thereof, may process the sensor data 628, as described above, and may send their respective outputs, over the network(s) 648, to the computing device(s) 636. In at least one example, the localization component 620, the perception component 622, the planning component 624, the system controller(s) 626, and the classifier component 122 may send their respective outputs to the computing device(s) 636 at a particular frequency, after a lapse of a predetermined period of time, in near real-time, etc.

In some examples, the vehicle 602 may send the sensor data 628 and/or the vehicle data 632 to the computing device(s) 636 via the network(s) 638. In some examples, the vehicle 602 may receive sensor data 628 from the computing device(s) 636 via the network(s) 638. The sensor data 628 may include raw sensor data and/or processed sensor data 628 and/or representations of sensor data 628. In some examples, the sensor data 628 (raw or processed) may be sent and/or received as one or more log files.

The computing device(s) 636 may include processor(s) 640, communication connection(s) 642, and the memory 634. In some instances, the computing device(s) 636 may be configured to perform one or more of the processes described herein with respect to the vehicle 602. In such instances, the computing device(s) 636 may send, to the vehicle 602, data representing results of the processing.

As further illustrated in the example of FIG. 6, the computing device(s) 636 may store ground truth data 644. The computing device(s) 636 may receive the ground truth data 644 associated with the identified events, where the ground truth data 644 can be manually labeled and/or determined from other, validated, machine learned components. For instance, the ground truth data 644 may classify whether the identified events, which may include potentially unsafe events, include actual unsafe events or safe events. In some instances, the computing device(s) 636 send the vehicle data 632 and/or simulation data 646 (which may include simulation data 106 and/or simulation data 206) representing the identified events to one or more other devices for analysis, such as human analysis. The computing device(s) 636 then receive the ground truth data 644 from the one or more other devices.

The processor(s) 616 of the vehicle 602 and the processor(s) 640 of the computing device(s) 636 may be any suitable processor capable of executing instructions to process data and perform operations as described herein. By way of example and not limitation, the processor(s) 616 and 640 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and 634 are examples of non-transitory computer-readable media. The memory 618 and 634 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 618 and 634 may include at least a working memory and a storage memory. For example, the working memory may be a high-speed memory of limited capacity (e.g., cache memory) that is used for storing data to be operated on by the processor(s) 616 and 640. In some instances, the memory 618 and 634 may include a storage memory that may be a lower-speed memory of relatively large capacity that is used for long-term storage of data. In some cases, the processor(s) 616 and 634 cannot operate directly on data that is stored in the storage memory, and data may need to be loaded into a working memory for performing operations based on the data, as discussed herein.

It should be noted that while FIG. 6 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

Figure 7:
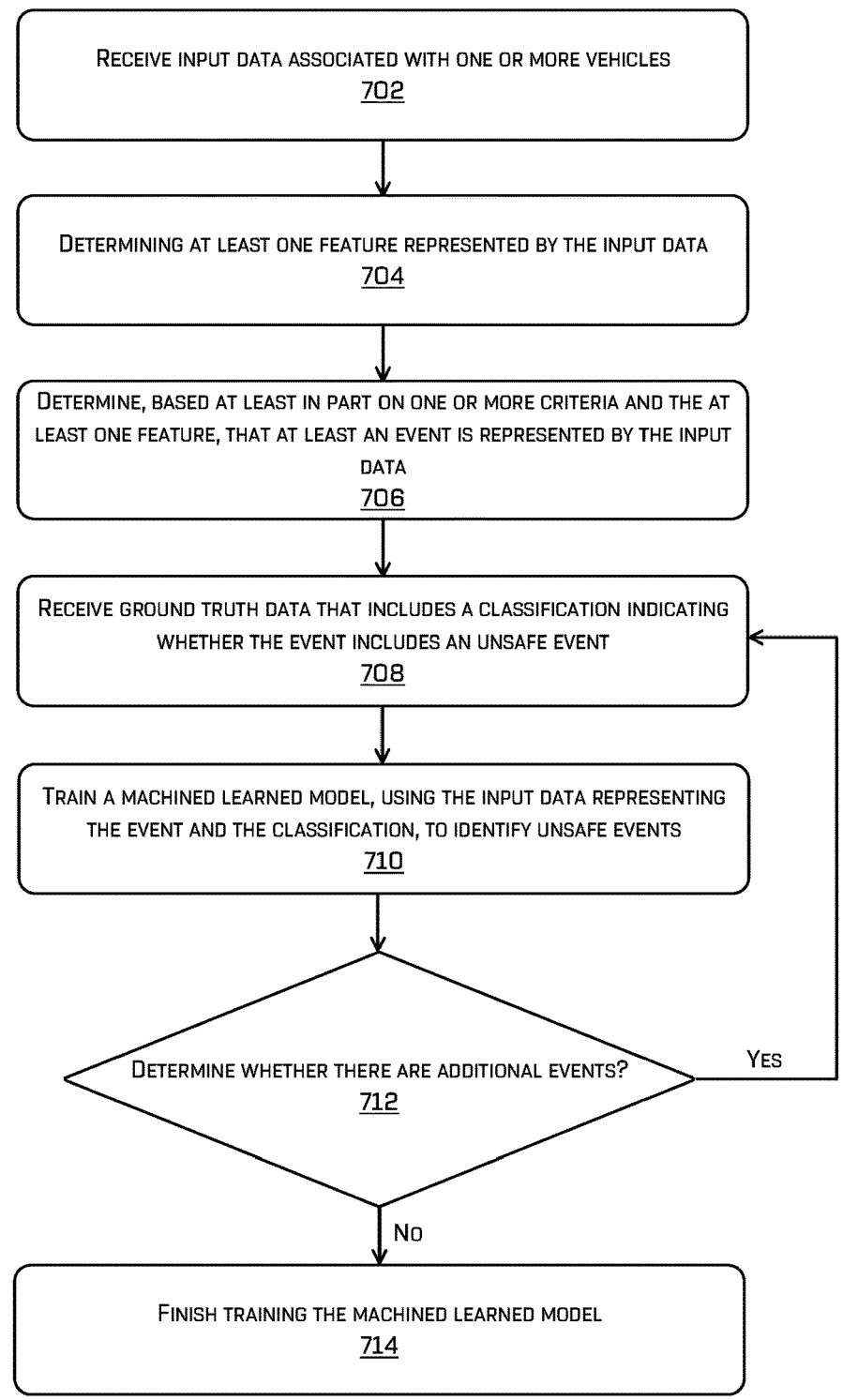
FIG. 7 illustrates an example process for training, using input data, a machine learned model to identify unsafe events, in accordance with embodiments of the disclosure.
Figure 8:
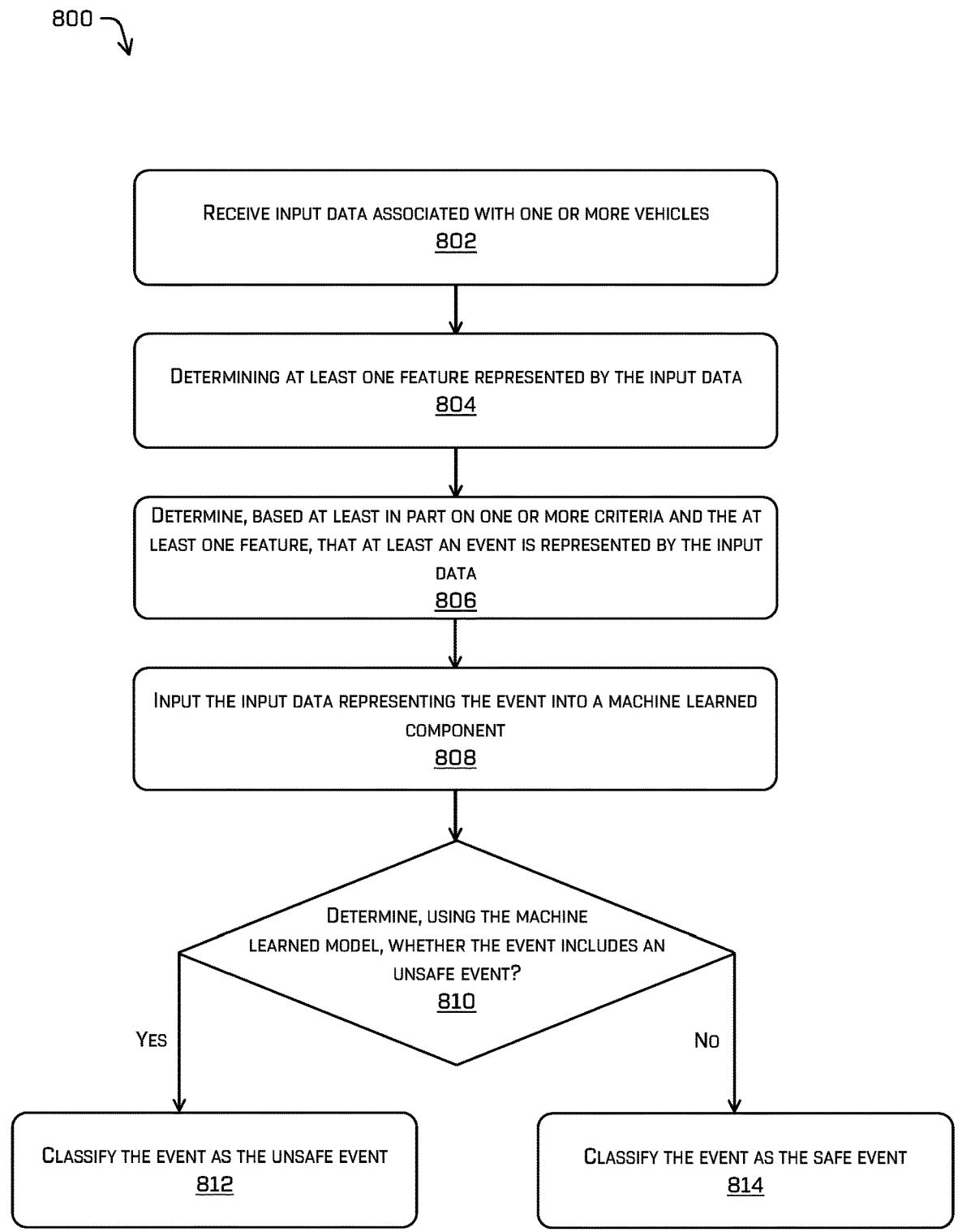
FIG. 8 illustrates an example process for using a machine learned model to identify unsafe events, in accordance with embodiments of the disclosure.
Figure 9:
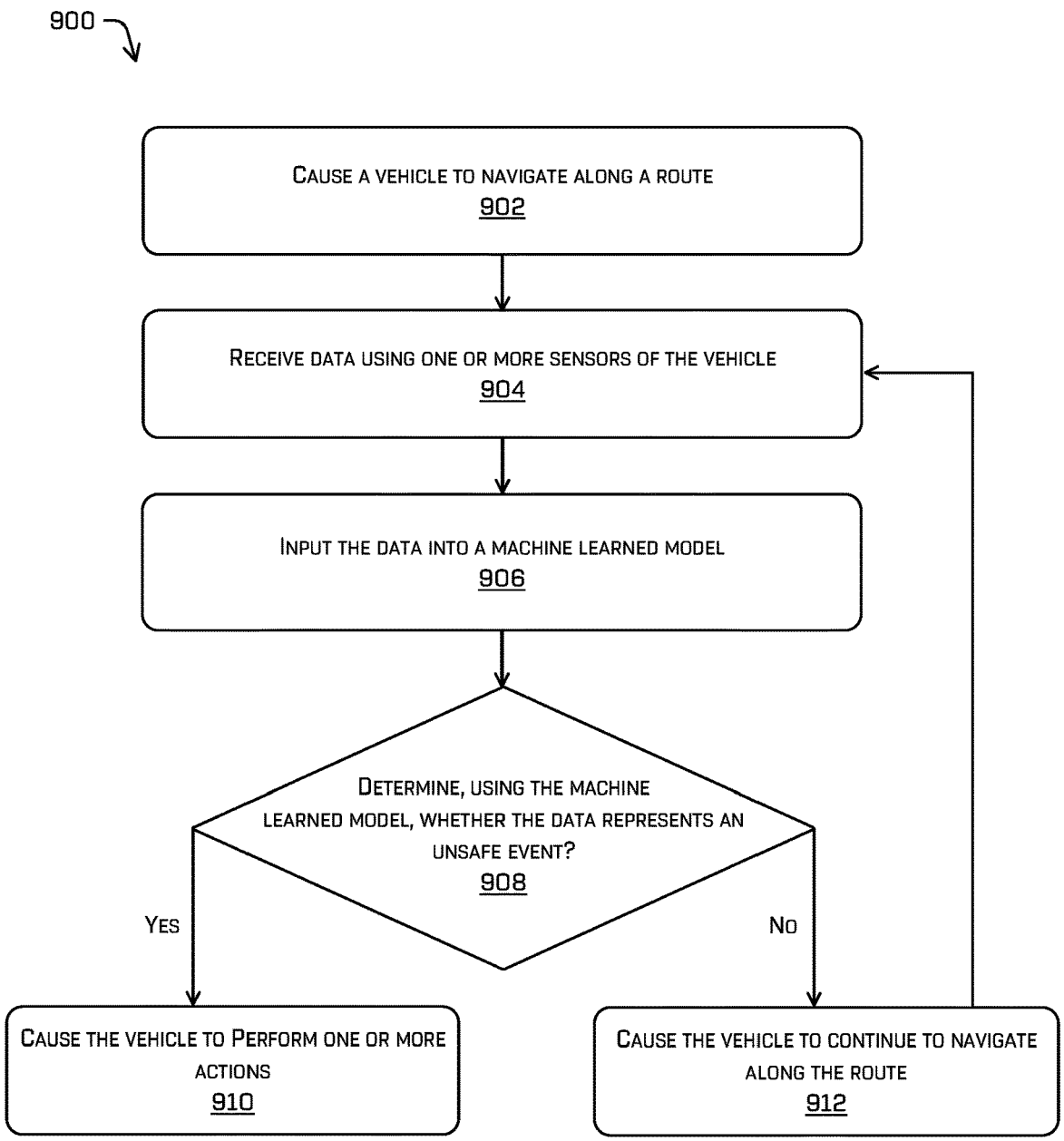
FIG. 9 illustrates an example process for using a machine learned model to avoid unsafe events while navigating along a trajectory, in accordance with embodiments of the disclosure.

FIGS. 7-9 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 7 depicts an example process 700 for training, using input data, a machine learned model to identify unsafe event, in accordance with embodiments of the disclosure. At operation 702, the process 700 may include receiving input data associated with one or more vehicles. For instance, the computing device(s) 636 may receive the input data, where the input data includes vehicle data, simulation data, and/or one or more other types of data. In some instances, the computing device(s) 636 receive at least a portion of the input data from one or more vehicles. In some instances, the computing device(s) 636 receive at least a portion of the input data from one or more devices that generate simulations.

At operation 704, the process 700 may include determining at least one feature represented by the input data. For instance, the computing device(s) 636 may analyze the input data in order to determine the at least one feature represented by the input data. In some instances, the computing device(s) 636 determine the at least one feature at various time intervals of the input data. The at least one feature may include, but is not limited to, a speed associated with an vehicle, an acceleration associated with an vehicle, a deceleration associated with an vehicle, a pose of an vehicle, a direction of travel of an vehicle, a distance between an vehicle and an object (e.g., a closeness in space between two vehicles), a time difference between when an vehicle navigates to a location and another vehicle navigates to the location (e.g., a closeness in time between two vehicles), and/or the like.

At operation 706, the process 700 may include determining, based at least in part on one or more criteria and the at least one feature, that at least an event is represented by the input data. For instance, the computing device(s) 636 may analyze the at least one feature using the one or more criteria, where the one or more criteria are configured to identify events represented by the input data. In some instance, the one or more criteria are configured to identify events that include potential unsafe events. Based at least in part on the analysis, the computing device(s) 636 may identify the at least one event.

At operation 708, the process 700 may include receiving ground truth data that includes a classification indicating whether the event includes an unsafe event. For instance, the computing device(s) 636 may receive the ground truth data. As discussed herein, the ground truth data can be manually labeled and/or determined from other, validated, machine learned components. For example, a human viewing the event may determine whether the event includes the unsafe event or a safe event. The human may then classify the event based on the determination. As such, the ground truth data may verify whether the event determined using the one or more criteria includes an actual unsafe event.

At operation 710, the process 700 may include training a machined learned mode, using the input data representing the event and the classification, to identify unsafe events. For instance, the computing device(s) 636 may input the input data representing the event and the classification into the machine learned model. By inputting the input data and the classification, one or more parameters of the machine learned model may be altered. The machine learned model may then later be used to analyze additional input data to determine whether the additional input data represents a safe event or an unsafe event.

At operation 712, the process 700 may include determining whether there are additional events represented by the input data. For instance, the computing device(s) 636 may determine whether there are any other additional events detected. If, at operation 712, it is determined that there are additional events, then the process 700 may repeat back at operation 708 in order to continue training the machined learned model using the additional events. However, if at operation 712, it is determined that there are no additional events, then at operation 714, the process 700 may include finishing training the machined learned model. For instance, if the computing device(s) 636 determine that there are no additional events, then the computing device(s) 636 may determine that the training of the machine learned model is complete.

FIG. 8 illustrates an example process 800 for using a machine learned model to identify unsafe events, in accordance with embodiments of the disclosure. At operation 802, the process 800 may include receiving input data associated with one or more vehicles. For instance, the computing device(s) 636 may receive the input data, where the input data includes vehicle data, simulation data, and/or one or more other types of data. In some instances, the computing device(s) 636 receive at least a portion of the input data from one or more vehicles. In some instances, the computing device(s) 636 receive at least a portion of the input data from one or more devices that generate simulations.

At operation 804, the process 800 may include determining at least one feature represented by the input data. For instance, the computing device(s) 636 may analyze the input data in order to determine the at least one features represented by the input data. In some instances, the computing device(s) 636 determine the at least one feature at various time intervals of the input data. The at least one features may include, but is not limited to, a speed associated with an vehicle, an acceleration associated with an vehicle, a deceleration associated with an vehicle, a pose of an vehicle, a direction of travel of an vehicle, a distance between an vehicle and an object (e.g., a closeness in space between two vehicles), a time difference between when an vehicle navigates to a location and another vehicle navigates to the location (e.g., a closeness in time between two vehicles), and/or the like.

At operation 806, the process 800 may include determining, based at least in part on one or more criteria and the at least one feature, that at least an event is represented by the input data. For instance, the computing device(s) 636 may analyze the at least one feature using the one or more criteria, where the one or more criteria are configured to identify events represented by the input data. In some instance, the one or more criteria are configured to identify events that include potential unsafe events. Based at least in part on the analysis, the computing device(s) 636 may identify the at least one event.

At operation 808, the process 800 may include inputting the input data representing the event into a machine learned model. For instance, the computing device(s) 636 may input the input data into the machine learned model. The machine learned model may be configured to analyze the input data in order to determine whether the input data represents unsafe events or safe events.

At operation 810, the process 800 may include determining, using the machine learned model, whether the event includes an unsafe event. For instance, the computing device(s) may receive an output from the machine learned model. The output may include a classification indicating whether the event includes a safe event or an unsafe event.

If, at operation 810, it is determined that the event includes the unsafe event, then at operation 812, the process 800 may include classifying the event as the unsafe event. For instance, if the computing device(s) 636 determine that the event includes the unsafe even, then the computing device(s) 636 may classify the event as the unsafe event. However, if, at operation 810, it is determined that the event does not include the unsafe event, then at operation 814, the process 800 may include classifying the event as a safe event. For instance, if the computing device(s) 636 determine that the event does not include the unsafe even, then the computing device(s) 636 may classify the event as the safe event.

FIG. 9 illustrates an example process 900 for using a machine learned model to avoid unsafe events while navigating along a route, in accordance with embodiments of the disclosure. At operation 902, the process 900 may include causing a vehicle to navigate along a route. For instance, the vehicle 602 may be navigating along the route within the environment. The environment may include one or more static objects and/or one or more dynamic objects.

At operation 904, the process 900 may include receiving sensor data using one or more sensors of the vehicle and at 906, the process 900 may include inputting the data into a machine learned model. For instance, while navigating along the route, the vehicle 602 may be generating the data using one or more sensors. The vehicle 602 may then input the data into the machine learned model, where the machine learned model is configured to identify unsafe events. In some instances, before inputting the data into the machine learned model, the vehicle 602 may first process the data using a mining component, a sampling component, a criteria component, and/or a filtering component in order to determine that the data represents a potential unsafe event.

At 908, the process 900 may include determining, using the machine learned model, whether the data represents an unsafe event. For instance, the machine learned model may output data classifying whether the data represents an unsafe event and/or a safe event. As such, the vehicle 602 may analyze the input data in order to determine whether the vehicle 602 is approaching an unsafe event.

If, at operation 908, it is determined that the data represents the unsafe event, then at operation 910, the process 900 may include causing the vehicle to perform one or more actions. For instance, if the vehicle 602 determines that the data represents the unsafe event, then the vehicle 602 may perform one or more actions in order to avoid the unsafe event (e.g., in order to avoid a collision). For example, the vehicle 602 may change a velocity (e.g., reduce the velocity), change to a new route, safely stop at a location, and/or the like.

However, if at operation 908 it is determined that the data does not represent the unsafe event, then at operation 912, the process 900 may include causing the vehicle to continue to navigate along the route. For instance, if the vehicle 602 determines that the data does not represent the unsafe event, then the vehicle 602 may continue to navigate along the route. Additionally, in some instances, the process 900 may repeat back at operation 904 such that the vehicle 602 can continue to identify unsafe events while navigating.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A: A system comprising: one or more processors; and one or more computer-readable media storing instructions that, when executed by the one or more processors, cause the one or more processors to perform operations comprising: receiving vehicle data generated by an autonomous vehicle; determining, based at least in part on a portion of the vehicle data, a feature; determining, based at least in part on the feature and one or more criteria, whether the at least the portion of vehicle data corresponds to a potentially unsafe event; receiving ground truth data representing a classification for the event as one or more of a safe event or an unsafe event; training, based at least in part on the portion of the vehicle data and the classification, a machine learning model to generate a trained machined learned model; and transmitting the trained machine learned model to an autonomous vehicle, the autonomous vehicle configured to input additional vehicle data into the trained machine learned model and to perform a maneuver based at least in part on an output of the trained machine learned model.

B: The system as recited in paragraph A, wherein training the machine learned model comprises: inputting the at least the portion of the vehicle data into the machine learning model; receiving, from the machine learning model, an output classification, the output classification indicating that the event includes a safe event; and determining a difference between the classification and the additional classification, and wherein training the machine learning model comprises altering one or more parameters of the machine learning model to minimize the difference and obtain the trained machine learned model.

C: The system as recited in either of paragraphs A or B, the operations further comprising: receiving additional vehicle data; determining, based at least in part on at least a portion of the additional vehicle data, an additional feature; determining, based at least in part on the additional feature and the one or more criteria, that the at least the portion of the vehicle data corresponds to an additionally potential unsafe event; inputting the at least the portion of the additional vehicle data representing the additional event into the trained machine learned model; and receiving, from the trained machine learned model, an additional classification indicating that the additional event includes an additional unsafe event.

D: The system as recited in any one of paragraphs A-C, wherein the feature includes at least one of: a velocity associated with the autonomous vehicle; an acceleration associated with the autonomous vehicle; a deceleration associated with the autonomous vehicle; a pose associated with the autonomous vehicle; a distance between the autonomous vehicle and an object; or a time difference between the autonomous vehicle navigating to a location and an additional vehicle navigating to the location.

E: The system as recited in any one of paragraphs A-D, wherein the one or more criteria includes at least one of: a time to collision is less than a first time threshold; a deceleration is equal to or greater than a deceleration threshold; a distance between a vehicle and an object is less than a threshold distance when a velocity of the vehicle is equal to or greater than a velocity threshold; a minimum stopping distance associated with a vehicle is less than a distance to a potential point of collision; a time of acceleration is equal to or greater than a second time threshold; or a time of deceleration is equal to or greater than a third time threshold.

F: A method comprising: receiving data associated with a vehicle; determining a feature represented by at least a portion of the data; determining, based at least in part on the feature and one or more criteria, a potentially unsafe operation of the vehicle; receiving ground truth data representing a classification indicating whether the at least the portion of data is associated with an unsafe operation of the vehicle; and training, based at least in part on the portion of date and the ground truth data, a machine learned model to generate a trained machined learned model.

G: The method as recited in paragraphs F, further comprising: receiving additional input data; determining at least an additional feature represented by the additional input data; determining, based at least in part on the additional feature, that an additional event represented by the additional input data includes an additional potential unsafe event; inputting the additional input data representing the additional event into the machine learned model; and receiving, from the machine learned model, an additional classification indicating that the additional event includes an additional unsafe event.

H: The method as recited in either of paragraphs F or G, wherein receiving the ground truth data comprises: causing a display to display a context of the potentially unsafe operating condition to a user; and receiving, from the user and as the ground truth data, a confirmation of the potentially unsafe operating condition being unsafe.

I: The method as recited in any one of paragraphs F-H, wherein the feature includes at least one of: a velocity associated with a vehicle; an acceleration associated with the vehicle; a deceleration associated with the vehicle; a pose associated with the vehicle; a distance between the vehicle and an object; or a time difference between the vehicle navigating to a location and an additional vehicle navigating to the location.

J: The method as recited in any one of paragraphs F-I, wherein the one or more criteria include at least one of: a time to collision is less than a first time threshold; a deceleration is equal to or greater than a deceleration threshold; a distance between a vehicle and an object is less than a threshold distance when a velocity of the vehicle is equal to or greater than a velocity threshold; a minimum stopping distance associated with the vehicle is less than a distance to a potential point of collision; a time of acceleration is equal to or greater than a second time threshold; or a time of deceleration is equal to or greater than a third time threshold.

K: The method as recited in any one of paragraphs F-J, wherein: determining the feature represented by the at least the portion of the data comprises determining the feature represented by the at least the portion of the data at a given timestamp within the data; and the classification indicates that the timestamp within the input data represents the unsafe event.

L: The method as recited in any one of paragraphs F-K, wherein the data comprises at least one of: vehicle data generated by the vehicle; or simulation data representing a simulated environment for testing at least one component of the vehicle.

M: The method as recited in any one of paragraphs F-L, wherein the trained machine learned model is transmitted to an autonomous vehicle for use by the autonomous vehicle to identify one or more potentially unsafe events.

N: The method as recited in any one of paragraphs F-M, further comprising: determining a trend associated with potentially unsafe events based at least in part on the feature associated with the event and an additional feature associated with an additional event; and storing data representing the trend.

O: One or more non-transitory computer-readable media storing instructions that, when executed by one or more processors, cause one or more computing devices to perform operations comprising: receiving data associated with a vehicle; determining a feature represented by at least a portion of the data; determining, based at least in part on the feature and one or more criteria, a potentially unsafe operating condition of the vehicle; inputting the at least the portion of the input data into a machine learned model; and receiving, from the machine learned model, a classification for the at least the portion of the data, the classification indicating an unsafe operating condition of the vehicle.

P: The one or more non-transitory computer-readable media as recited in paragraph O, the operations further comprising: receiving additional data; determining at least an additional feature represented by at least a portion of the additional data; determining, based at least in part on the additional feature and the one or more criteria, an additional potentially unsafe operating condition of the vehicle; receiving ground truth data representing a classification indicating that the at least the portion of additional data is associated with an unsafe operating condition of the vehicle; and training, based at least in part on the at least the portion of the additional data, a machine learning model to generate the machined learned model.

Q: The one or more non-transitory computer-readable media as recited in either of paragraphs O or P, wherein receiving the ground truth data comprises: causing a display to display a context of the additional potentially unsafe operating condition to a user; and receiving, from the user and as the ground truth data, a confirmation of the additional potentially unsafe operating condition being unsafe.

R: The one or more non-transitory computer-readable media as recited in any one of paragraphs O-Q, wherein the feature includes at least one of: a velocity associated with a vehicle; an acceleration associated with the vehicle; a deceleration associated with the vehicle; a pose associated with the vehicle; a distance between the vehicle and an object; or a time difference between the vehicle navigating to a location and an additional vehicle navigating to the location.

S: The one or more non-transitory computer-readable media as recited in any one of paragraphs O-R, wherein the one or more criteria include at least one of: a time to collision is less than a first time threshold; a deceleration is equal to or greater than a deceleration threshold; a distance between a vehicle and an object is less than a threshold distance when a velocity of the vehicle is equal to or greater than a velocity threshold; a minimum stopping distance associated with the vehicle is less than a distance to a potential point of collision; a time of acceleration is equal to or greater than a second time threshold; or a time of deceleration is equal to or greater than a third time threshold.

T: The one or more non-transitory computer-readable media as recited in any one of paragraphs O-S, wherein the data comprises at least one of: vehicle data generated by the vehicle; or simulation data representing a simulated environment for testing at least one component of the vehicle.

What is claimed is:

1. A system comprising:
one or more processors; and
one or more computer-readable media storing instructions that, when executed by the one or more processors, cause the one or more processors to perform operations comprising:
receiving vehicle data generated by an autonomous vehicle;
determining, based at least in part on a portion of the vehicle data, a feature;
determining, based at least in part on the feature and one or more criteria, whether the at least the portion of vehicle data corresponds to a potentially unsafe event;
receiving ground truth data representing a classification for the potentially unsafe event as one or more of a safe event or an unsafe event;
training, based at least in part on the portion of the vehicle data and the classification, a machine learning model to generate a trained machined learned model; and
transmitting the trained machine learned model to the autonomous vehicle, the autonomous vehicle configured to input additional vehicle data into the trained machine learned model and to perform a maneuver based at least in part on an output of the trained machine learned model.

2. The system as recited in claim 1, wherein training the machine learned model comprises:
inputting the portion of the vehicle data into the machine learning model;
receiving, from the machine learning model, an output classification, the output classification indicating that the potentially unsafe event includes a safe event; and
determining a difference between the classification and the additional classification,
wherein training the machine learning model comprises altering one or more parameters of the machine learning model to minimize the difference and obtain the trained machine learned model.

3. The system as recited in claim 1, the operations further comprising:
receiving additional vehicle data;
determining, based at least in part on at least a portion of the additional vehicle data, an additional feature;
determining, based at least in part on the additional feature and the one or more criteria, that the portion of the vehicle data corresponds to an additionally potential unsafe event;
inputting the at least the portion of the additional vehicle data representing the additional event into the trained machine learned model; and
receiving, from the trained machine learned model, an additional classification indicating that the additional event includes an additional unsafe event.

4. The system as recited in claim 1, wherein the feature includes at least one of:
a velocity associated with the autonomous vehicle;
an acceleration associated with the autonomous vehicle;
a deceleration associated with the autonomous vehicle;
a pose associated with the autonomous vehicle;
a distance between the autonomous vehicle and an object; or
a time difference between the autonomous vehicle navigating to a location and an additional vehicle navigating to the location.

5. The system as recited in claim 1, wherein the one or more criteria includes at least one of:
a time to collision is less than a first time threshold;
a deceleration is equal to or greater than a deceleration threshold;
a distance between the autonomous vehicle and an object is less than a threshold distance when a velocity of the autonomous vehicle is equal to or greater than a velocity threshold;
a minimum stopping distance associated with the autonomous vehicle is less than a distance to a potential point of collision;
a time of acceleration is equal to or greater than a second time threshold; or
a time of deceleration is equal to or greater than a third time threshold.

6. A method comprising:
receiving data associated with a vehicle;
determining a feature represented by at least a portion of the data;
determining, based at least in part on the feature and one or more criteria, a potentially unsafe operation of the vehicle;
receiving ground truth data representing a classification indicating whether the portion of data is associated with an unsafe operation of the vehicle;
training, based at least in part on the portion of date and the ground truth data, a machine learned model to generate a trained machined learned model; and
transmitting the trained machine learned model to the vehicle, the vehicle configured to input additional data associated with the vehicle into the trained machine learned model and to perform a maneuver based at least in part on an output of the trained machine learned model.

7. The method as recited in claim 6, further comprising:
receiving additional input data;
determining at least an additional feature represented by the additional input data;
determining, based at least in part on the additional feature, that an additional event represented by the additional input data includes an additional potential unsafe event;
inputting the additional input data representing the additional event into the machine learned model; and
receiving, from the machine learned model, an additional classification indicating that the additional event includes an additional unsafe event.

8. The method as recited in claim 6, wherein receiving the ground truth data comprises:
causing a display to display a context of the potentially unsafe operation of the vehicle to a user; and
receiving, from the user and as the ground truth data, a confirmation of the potentially unsafe operating condition being unsafe.

9. The method as recited in claim 6, wherein the feature includes at least one of:
a velocity associated with the vehicle;
an acceleration associated with the vehicle;
a deceleration associated with the vehicle;
a pose associated with the vehicle;
a distance between the vehicle and an object; or
a time difference between the vehicle navigating to a location and an additional vehicle navigating to the location.

10. The method as recited in claim 6, wherein the one or more criteria include at least one of:
- a time to collision is less than a first time threshold;
- a deceleration is equal to or greater than a deceleration threshold;
- a distance between the vehicle and an object is less than a threshold distance when a velocity of the vehicle is equal to or greater than a velocity threshold;
- a minimum stopping distance associated with the vehicle is less than a distance to a potential point of collision;
- a time of acceleration is equal to or greater than a second time threshold; or
- a time of deceleration is equal to or greater than a third time threshold.

11. The method as recited in claim 6, wherein:
- determining the feature represented by the at least the portion of the data comprises determining the feature represented by the at least the portion of the data at a given timestamp within the data; and
- the classification indicates that the timestamp within the input data represents the potentially unsafe operation of the vehicle.

12. The method as recited in claim 6, wherein the data comprises at least one of:
- vehicle data generated by the vehicle; or
- simulation data representing a simulated environment for testing at least one component of the vehicle.

13. The method as recited in claim 6, wherein the trained machine learned model is transmitted to the vehicle for use by the autonomous vehicle to identify one or more potentially unsafe events.

14. The method as recited in claim 6, further comprising:
- determining a trend associated with potentially unsafe events based at least in part on the feature associated with the potentially unsafe operation of the vehicle and an additional feature associated with an additional event; and
- storing data representing the trend.

15. One or more non-transitory computer-readable media storing instructions that, when executed by one or more processors, cause one or more computing devices to perform operations comprising:
- receiving data associated with a vehicle;
- determining a feature represented by at least a portion of the data;
- determining, based at least in part on the feature and one or more criteria, a potentially unsafe operating condition of the vehicle;
- inputting the portion of the input data into a machine learned model;
- receiving, from the machine learned model, a classification for the portion of the data, the classification indicating an unsafe operating condition of the vehicle; and
- transmitting the machine learned model to the vehicle, the vehicle configured to input additional data associated with the vehicle into the machine learned model and to perform a maneuver based at least in part on an output of the machine learned model.

16. The one or more non-transitory computer-readable media as recited in claim 15, the operations further comprising:
- receiving additional data;
- determining at least an additional feature represented by at least a portion of the additional data;
- determining, based at least in part on the additional feature and the one or more criteria, an additional potentially unsafe operating condition of the vehicle;
- receiving ground truth data representing a classification indicating that the portion of the additional data is associated with the unsafe operating condition of the vehicle; and
- training, based at least in part on the at least the portion of the additional data, a machine learning model to generate the machined learned model.

17. The one or more non-transitory computer-readable media as recited in claim 16, wherein receiving the ground truth data comprises:
- causing a display to display a context of the additional potentially unsafe to a user; and
- receiving, from the user and as the ground truth data, a confirmation of the additional potentially unsafe operating condition being unsafe.

18. The one or more non-transitory computer-readable media as recited in claim 16, wherein the feature includes at least one of:
- a velocity associated with the vehicle;
- an acceleration associated with the vehicle;
- a deceleration associated with the vehicle;
- a pose associated with the vehicle;
- a distance between the vehicle and an object; or
- a time difference between the vehicle navigating to a location and an additional vehicle navigating to the location.

19. The one or more non-transitory computer-readable media as recited in claim 16, wherein the one or more criteria include at least one of:
- a time to collision is less than a first time threshold;
- a deceleration is equal to or greater than a deceleration threshold;
- a distance between the vehicle and an object is less than a threshold distance when a velocity of the vehicle is equal to or greater than a velocity threshold;
- a minimum stopping distance associated with the vehicle is less than a distance to a potential point of collision;
- a time of acceleration is equal to or greater than a second time threshold; or
- a time of deceleration is equal to or greater than a third time threshold.

20. The one or more non-transitory computer-readable media as recited in claim 16, wherein the data comprises at least one of:
- vehicle data generated by the vehicle; or
- simulation data representing a simulated environment for testing at least one component of the vehicle.

* * * * *